June 22, 1954 M. R. GREEN 2,681,811
RETRACTABLE WHEEL GEAR FOR LAND VEHICLES
Filed March 17, 1952 4 Sheets-Sheet 1

INVENTOR
Maurice R Green
BY
Alexander Dowell
ATTORNEYS

June 22, 1954 M. R. GREEN 2,681,811
RETRACTABLE WHEEL GEAR FOR LAND VEHICLES
Filed March 17, 1952 4 Sheets-Sheet 2

INVENTOR
Maurice R. Green
BY
Alexander Dowell
ATTORNEYS

June 22, 1954  M. R. GREEN  2,681,811
RETRACTABLE WHEEL GEAR FOR LAND VEHICLES
Filed March 17, 1952  4 Sheets-Sheet 3

INVENTOR
Maurice R. Green
BY
Alexander Howell
ATTORNEYS

June 22, 1954   M. R. GREEN   2,681,811
RETRACTABLE WHEEL GEAR FOR LAND VEHICLES
Filed March 17, 1952   4 Sheets-Sheet 4

INVENTOR
Maurice R. Green
BY
Alexander Dowell
ATTORNEYS

Patented June 22, 1954

2,681,811

UNITED STATES PATENT OFFICE 2,681,811

RETRACTABLE WHEEL GEAR FOR LAND VEHICLES

Maurice Raymond Green, Bedford, England, assignor of one-half to The Ibbett Engineering Company Limited, Bedford, England, a British company Application March 17, 1952, Serial No. 276,924

3 Claims. (Cl. 280—44)

This invention concerns retractible wheel gear for caravans, trailers, mobile kiosks and any other land vehicles (all hereinafter referred to and included in the term "caravans"), and to caravans furnished with such retractible wheel gear.

According to a further feature of this invention, where hydraulically-operable jacking means are employed for lowering the said wheels, the hydraulic systems for such jacking means may include a pressure gauge, conveniently graduated with weight graduations, e. g. hundredweights, quarters and pounds adapted to indicate the liquid pressure in such system to measure the load carried by the wheels.

Further features of the invention will become apparent from the following description of an embodiment thereof.

In order that the invention may be more thoroughly understood, certain embodiments of the same are described by way of example with reference to the accompanying drawings in which.

Figure 1:
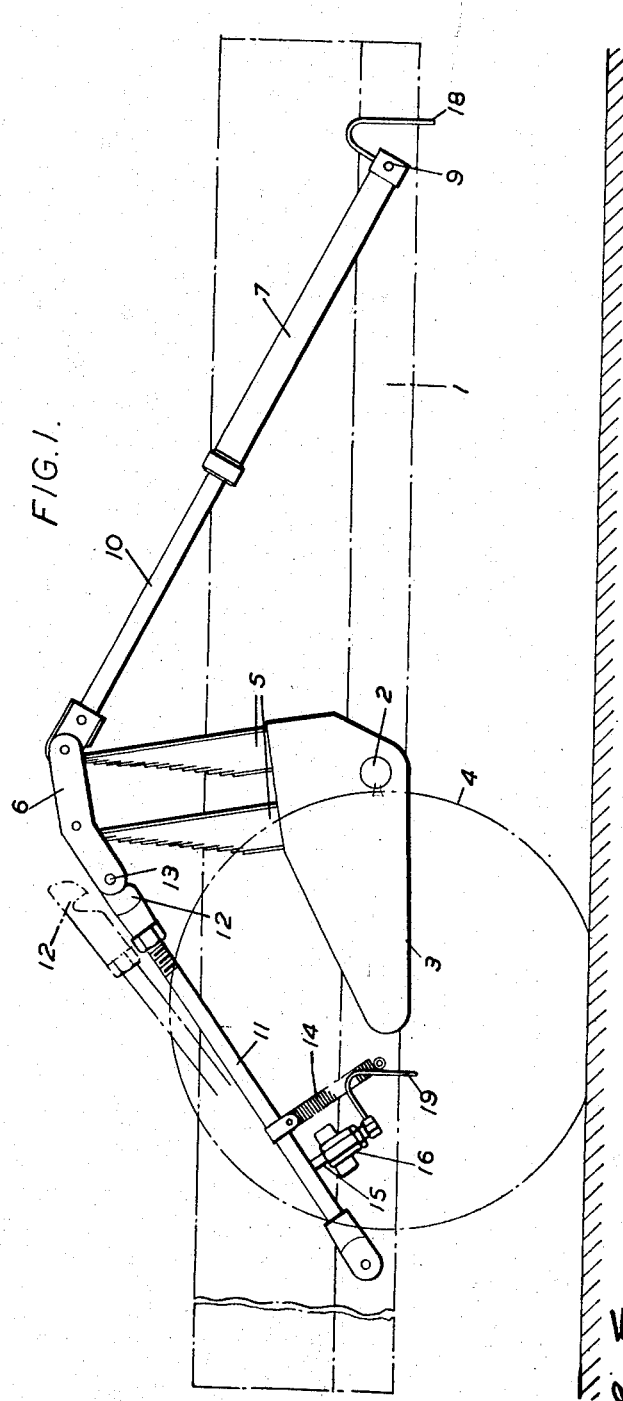
Figure 1 is a side elevation of a chassis, suspension arm and its associated jack and locking means for one wheel of a caravan, constructed in accordance with this invention and showing the mechanism in the "wheel lowered" condition.
Figure 2:
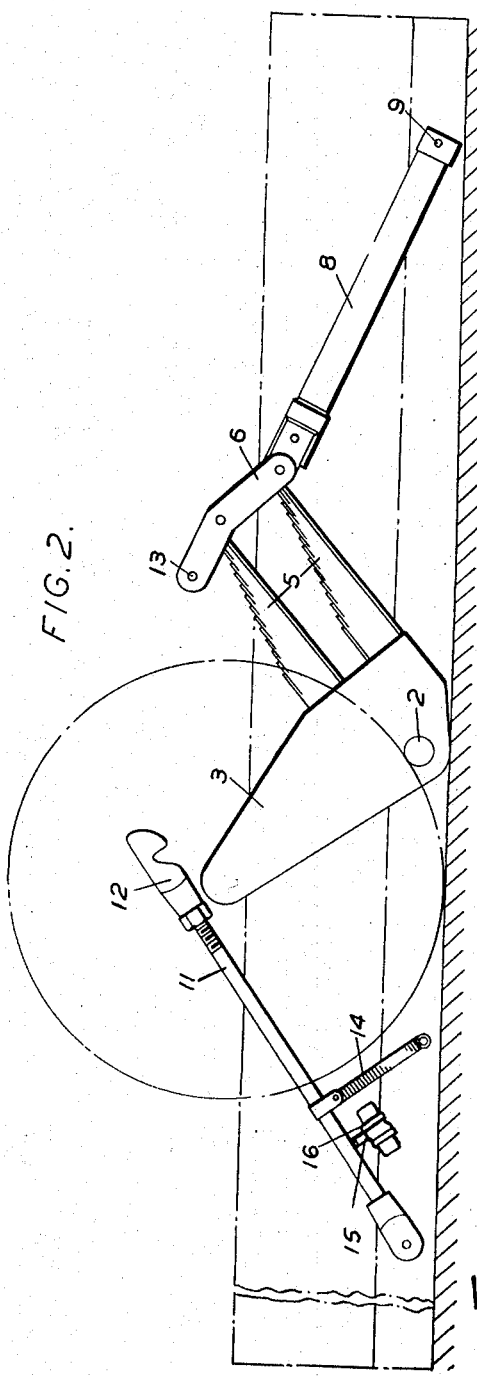
Figure 2 is a side elevation of the mechanism of Figure 1, showing the mechanism in the "wheel retracted" condition.
Figure 3:
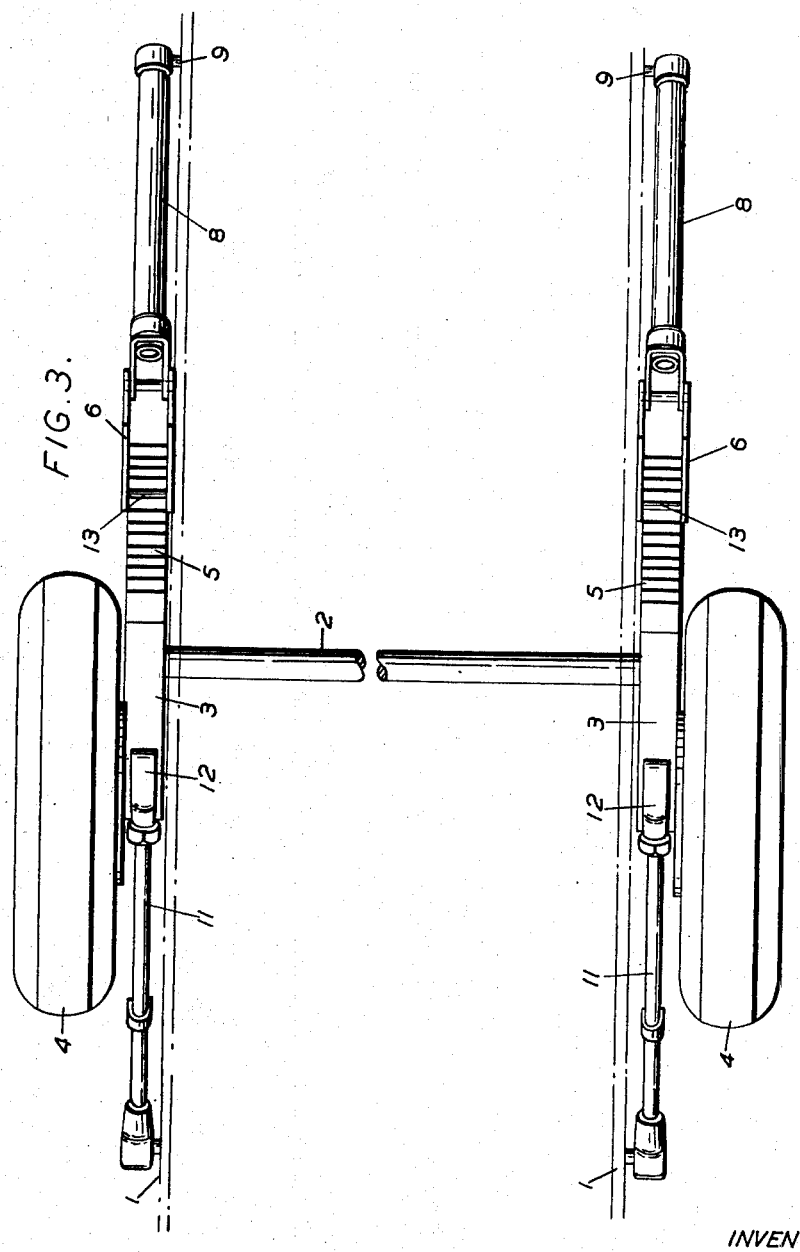
Figure 3 is a diagrammatic plan view showing the arrangement of the common shaft, suspension arms and two wheels of a pair of wheels for a caravan.

As shown in Figures 1 to 3, the caravan chassis 1 carries a common cross shaft 2 in suitable journals (not shown), said shaft 2 being restrained against axial movement but free to rotate about its axis.

Each end of the cross shaft 2 has a suspension arm 3 secured at one end thereto adjacent to the outer part of the chassis 1, said suspension arms being keyed or splined to the cross shaft so as to rotate unitarily therewith. The ends of the suspension arms 3 remote from the said shaft 2 are furnished with stub axles (not shown) upon which are mounted the wheels 4. As will be clearly seen from Figures 1 and 2, rotation of the shaft 2 about its axis raises or lowers the wheels 4.

Two sets of leaf springs 5 are secured at one of their ends to each of the said suspension arms 3 and are attached at their free ends to a bracket 6.

The arrangement is such that, as shown in Figure 1, when the wheels of the caravan are in their lowered position, the suspension arms 3 are substantially parallel to the chassis, i. e. horizontal, and the springs 5 project substantially vertically from the suspension arms 3.

A hydraulic jack 7 is provided for each of the suspension arms 3, each jack 7 comprising a cylinder 8 pivotally mounted at 9 upon the chassis 1, and a piston rod or bolt 10 axially slidable in the cylinder 8 and pivotally attached at the end thereof remote from the cylinder to the bracket 6.

The locking means in this embodiment of the invention comprise a locking arm 11 pivoted at one of its ends to the chassis 1 and furnished at its other end with a hook or catch 12 for engagement with a co-operating member 13 on the bracket 6, the said locking arm 11 being arranged on the opposite side of the suspension-arm shaft to the jack 7 and being oppositely inclined to the latter so that the jack 7 and the locking arm 11 are more or less symmetrically arranged about the vertical plane containing the axis of the said shaft 2; i. e. they are substantially as object and mirror image in relation to the said plane.

The locking arm 11 serves to engage the member 13 of the bracket 6 when the suspension arm 3 is in its lowered and substantially horizontal position and thereby prevents the retraction of the wheel 4 carried by this suspension arm. When the said hook or catch 12 of the locking arm 11 is thus engaged with the member 13, the hydraulic pressure in the jacking system may be released by means of a release valve in the hydraulic system.

Preferably, and as shown in Figures 1 and 2, the locking arm 11 is urged towards its locking position by spring or other resilient means; thus a tension spring 14 is anchored at one end thereof to the locking arm 11 and at its other end to the chassis 1 of the caravan, thereby urging the hook- or catch-provided end of the locking arm 11 towards the bracket 6.

Means are preferably provided to enable the catch 12 of the locking arm 11 to be mechanically disengaged from the member 13 of the bracket 6 in order to permit the wheel 4 carried by the suspension arm 3 to be retracted and preferably remote control means are provided for effecting this disengagement of the catch of the locking arm.

Thus, a hydraulic bolt 15, operating in a hydraulic cylinder 16 carried by the chassis 1, may be provided and adapted to engage the locking arm 11 on the side thereof nearer the suspension arm 3 with which it co-operates so that when hydraulic pressure is applied to the cylinder 16 the bolt 15 is urged therefrom and moves the hook or catch 12 of the locking arm 11 out of engagement with the member 13 so as to release the latter and permit the retraction of the said wheel when the liquid is permitted to leave the cylinder 8 of hydraulic jack 7.

Preferably, when it is desired to retract the wheels of the caravan, hydraulic pressure is applied to the jack cylinders so as slightly to extend or lower the wheels further than their locked positions, thereby to relieve the hooks or catches 12 of locking arms 11 of stress, whereupon pressure is applied to the cylinders 16 and the bolts 15 raise the locking arm 11 to the position shown in broken lines in Figure 1, and so release the hooks or catches 12 thereof from the members 13 of the brackets 6. Thereafter, the pressure in the cylinders 8 is released and the liquid permitted to pass from the cylinders to permit the jack piston rods 10 to recede into the cylinders 8 and the wheels 4 to retract.

Whilst the wheels are retracting, the pressure applied to the cylinders 16 is relieved and the locking arms 11 return to their initial positions under the action of the spring 14 so that, when the wheels 4 are next extended or lowered, the hooks or catches 12 of the locking arms 11, automatically engage latch-fashion with the members 13 carried by the brackets 6 and thereby automatically lock the wheel suspension arms 3 once again in their extended or lowered positions.

Figure 4:
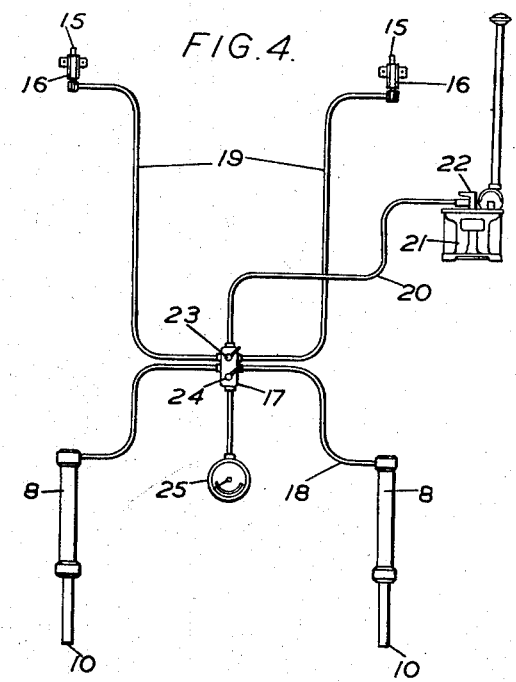
Figure 4 is a circuit diagram of the hydraulic jacking system of the mechanism shown in Figures 1 and 2.

As shown in Figure 4, the hydraulic system conveniently includes a control valve chest 17 connected by conduits 18 to each of the hydraulic jack cylinders 8. Further conduits 19 connect the valve chest 17 to each of the said release bolt cylinders 16, whilst another conduit 20 connects the valve chest 17 to a hand-operated pump 21, preferably mounted on the chassis.

The pump 21 is provided with a by-pass valve 22 which can be opened to permit the liquid in the hydraulic system to flow from the valve chest 7 to a suitable reservoir (not shown), or closed so that when the pump is actuated the liquid is pumped to the valve chest 17. The valve chest 17 is furnished with a locking-arm control valve 23 which controls the flow of liquid to and from the locking arm release bolt cylinders 16, the arrangement being such that this control valve 23 can be closed to retain the hydraulic pressure in the conduits 19 to the cylinders 16 and thereby maintain the bolts 15 in any desired position, and which can be opened to put the conduits 19 in communication with the conduits 20 connected to the pump 21.

Thus, when it is desired to retract the wheels 4 from their lowered and locked position, the by-pass valve 22 is closed and the control valve 23 opened; a few strokes of the pump will then cause the said jacks 7 to be further extended relieving the stress upon the locking arms 11, whereupon the locking arm release bolts 15 will cause the disengagement of the hooks or catches of the locking arms from the said members. The control valve 23 is then closed, causing the said release bolts 15 to remain in their extended positions, and the said by-pass valve 22 is opened, permitting the liquid to pass from the jack cylinders 8 to the said reservoir, the piston rods 10 of the jacks receiving in their cylinders 8 and permitting the wheels 4 to retract under the weight of the caravan.

To extend or lower the wheels 4 and thereby to return the chassis to its travelling position, the control valve 23 is opened so as to permit the locking-arm release bolts 15 to recede into their cylinders 16 and the locking arms 11 to return to their locking positions ready for locking the suspension arms 3 in their extended or lowered condition; the control valve 23 is then closed. The by-pass valve 22 is now closed and the pump operated so as to force liquid to the jacks 7 and extend the piston rods 10 of the latter and thereby lower the wheel suspension arms 3 and raise the chassis 1. When the suspension arms reach their extended position, the catches 12 of the locking arms 11 automatically snap into their locking positions to hold the suspension arms 3 against retraction and thereafter the by-pass valve 22 may be opened so as to relieve the jacks 7 and the conduits 18 of the hydraulic system of pressure, the load then being taken by the locking arms which should be sufficiently substantial for this purpose.

A pressure gauge 25 connected to the valve chest 17 is in communication with the conduits 18 connected to the said jack cylinders 8 via a weighing control valve 24. When the by-pass valve 22 is closed and the weighing control valve 24 opened, and the pump 21 operated to extend the wheels 4 to lift the chassis 1 to a predetermined position just clear of the ground, the pressure gauge (which is preferably calibrated in hundredweights and pounds) will register the total weight of the caravan and its load (less, of course, the weight of the wheels, suspension arms and their associated parts). Thus if the weight of the caravan, when unladen, is known (or is first separately measured), its load may readily be ascertained without recourse to the use of a weighbridge or the like, and the caravan may thus take the form of a mobile weighbridge and if desired, be suitably constructed for such a purpose.

Figure 5:
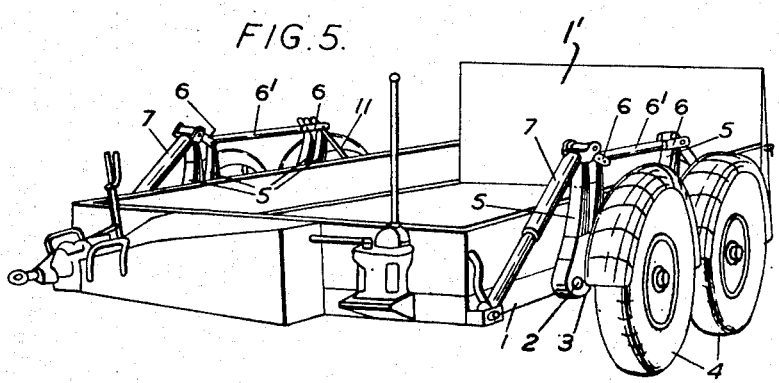
Figure 5 is a perspective view of a trailer furnished with retractible wheel gear according to this invention.

As shown in Figure 5, retractable wheel gear in accordance with this invention may advantageously be employed with a trailer; such a trailer is very convenient for a variety of purposes, for example, for transporting machinery, livestock, vehicles or the like, since the provision of retractible wheel gear enables the trailer to be lowered until its chassis rests firmly on the ground, thus providing a stable platform on to which goods can be loaded with the minimum of lifting.

Where heavy loads have to be transported, the trailer may have four or more wheels arranged in pairs. Thus the trailer may have four wheels, as shown, the suspension arms 3 each being furnished with a pair of leaf springs 5, secured to brackets 6 at their free ends as in the arrangement shown in Figures 1 and 2. The two brackets 6 on each side of the trailer are coupled together by means of a connecting rod 6' so that two jacks 7 are sufficient to retract or lower all wheels of the trailer; this arrangement also ensures that upon lowering the wheels, the trailer chassis will rise bodily substantially parallel with the ground. A single locking arm 11 is provided on each side of the chassis 1 and cooperates with the bracket 6 remote from that connected to the jack 7.

Conveniently, the trailer is furnished with a hinged tailboard 1' which may be lowered to form a loading ramp, up which goods to be transported may be slidden or wheeled, this will of course be a simple procedure in view of the small height of the floor of the trailer above the ground when the wheels are retracted.

In Figure 5 the construction of each of the hydraulic jacks 7 is substantially the same as that of the hydraulic jacks described with reference to Figures 1 to 3 but in this case the jacks are shown fitted with dust covers which protect the jacks from dirt and other foreign matter. These covers make the cylinder and connecting rod of the jack in Figure 5 appear to be reversed but this is not so as the cylinder of each jack is pivotally secured to the chassis and the upper part or connecting rod thereof is fitted to the upper ends of the springs 5.

The provision of the cross shaft or shafts 2, rigidly carrying the wheel suspension arms 3 ensures that side sway and roll of the caravan will be eliminated or much reduced whilst the wheel axles will always be substantially colinear and parallel to the said cross shaft or shafts, a condition which cannot be obtained by the use of independent wheel suspension or by cross axles sprung adjacent their ends. Thus balanced wheel springing is achieved. It will of course be understood that when the wheels are in their lowered position and the locking arms engaged with said brackets, the leaf springs on each side of the chassis share the load between them, any tendency for the chassis to roll or sway being rapidly damped by the torsion bar effect of the cross shaft or shafts.

The invention thus provides a construction which ensures balanced springing for the wheels of caravans or the like and which ensures that the body is maintained level when raised or lowered. Furthermore, the invention provides a mechanical locking device for the retractible wheels of caravans and the like to relieve the wheel retracting and extending system of stress when the wheels are extended or lowered, and to provide a safeguard in the case of failure of the jacking system, particularly where this is hydraulically operated; finally, the invention furnishes a means of using a hydraulic pressure gauge to determine the weight of the caravan and its load, whereby the caravan may take the form of, or be constructed as, a mobile weighbridge.

I claim:

1. A transporting device comprising a chassis, a cross-shaft extending transversely across the chassis and carried thereby, two suspension arms mounted at opposite ends of the cross-shaft and projecting radially therefrom, two ground engaging wheels mounted revolubly one on each of the suspension arms at some distance from the cross-shaft, two jacks located one at each side of the chassis, each jack having a fixed part connected to the chassis at some distance from said cross-shaft and a movable part extensible in relation to said fixed part, said movable part having one end carried by the fixed part and its other end remote from the fixed part, independent spring means carried by each of said suspension arms and extending outwardly of the cross-shaft, means connecting the outer ends of said spring means respectively to the remote ends of said movable parts of the jacks, whereby the jacks operate the arms to raise the chassis above the lower parts of the ground wheels but permit lowering of the chassis on to the ground, a catch member carried by said suspension arm, locking means at each side of the chassis for retaining said chassis in its raised position, each of said locking means comprising an arm pivotally carried at one of its ends by the chassis and which is furnished with a catch at the other of its ends whereby it may engage latch-wise with said catch member when said suspension arm is moved to its chassis-raised position, and release means for releasing, when desired, each locking arm from said suspension arm or member associated therewith to permit the wheel carried by said suspension arm to be retracted, said release means being operable from a position remote from said locking arm, said release means for each locking arm comprising a hydraulically operable bolt adapted, when operated, to move said locking arm in a catch-disengaging direction.

2. A transporting device comprising a chassis, a through or common cross-shaft extending transversely across the chassis and carried thereby, two suspension arms mounted at opposite ends of the cross-shaft and projecting radially therefrom, two ground wheels mounted revolubly one on each of the suspension arms at some distance from the cross-shaft, two hydraulic jacks located one at each side of the chassis, each hydraulic jack having a fixed part connected to the chassis at some distance from said cross-shaft and a movable part extensible in relation to said fixed part, said movable part having one end carried by the fixed part and its other end remote from the fixed part, independent spring means carried by each of said suspension arms and extending outwardly of the cross-shaft, means connecting the outer ends of said spring means respectively to the remote ends of said movable parts of the hydraulic jacks, whereby the hydraulic jacks operate the arms to raise the chassis above the lower parts of the wheels but permit lowering of the chassis on to the ground, a catch member carried by said suspension arm, locking means at each side of the chassis for retaining said chassis in its raised position, each locking means comprising a locking arm which is pivotally carried at one of its ends by the chassis and is furnished with a catch at the other of its ends whereby it may engage latch-wise with said catch member when said suspension arm is moved to its chassis-raised position, and a hydraulic system for operating said jacks including means for hydraulically operating release means for the locking arms, a manually operable pump, and also including valve means adjustable to control the rate of retraction of said ground wheels.

3. A transporting device according to claim 2, wherein the hydraulic system for said jacking means includes a pressure gauge adapted to indicate the pressure of liquid in such system thereby to enable the load carried by said ground wheels to be ascertained.

References Cited in the file of this patent

UNITED STATES PATENTS

| Number | Name | Date |
| --- | --- | --- |
| 2,227,762 | Ronning | Jan. 7, 1941 |
| 2,452,267 | Schramm | Oct. 26, 1948 |
| 2,453,388 | Schramm | Nov. 9, 1948 |
| 2,540,100 | Coeur | Feb. 6, 1951 |
| 2,614,863 | Schramm | Oct. 21, 1952 |